United States Patent [19]

Jones et al.

[11] 4,032,668

[45] June 28, 1977

[54] EXPANSION PROCESS FOR THE PRODUCTION OF INSTANT GRITS

[75] Inventors: Benjamin Bostick Jones, Savannah, Ga.; Richard John Karrasch, Sterrett; Stephen Wallace Eitel, Birmingham, both of Ala.

[73] Assignee: The Jim Dandy Company, Birmingham, Ala.

[22] Filed: Jan. 30, 1975

[21] Appl. No.: 545,754

[52] U.S. Cl. .............................................. 426/449
[51] Int. Cl.² ...................................... A23L 1/168
[58] Field of Search ........... 426/448, 449, 620, 621

[56] References Cited

UNITED STATES PATENTS

| | | | |
|---|---|---|---|
| 2,120,138 | 6/1938 | Mathews et al. | 426/448 |
| 2,653,103 | 9/1953 | Carman et al. | 426/449 X |
| 2,838,401 | 6/1958 | Gates | 426/449 |
| 3,117,006 | 1/1964 | Wenger | 426/448 |
| 3,458,321 | 7/1969 | Reinhart et al. | 426/448 |

*Primary Examiner*—Joseph M. Golian
*Attorney, Agent, or Firm*—Cushman, Darby & Cushman

[57] ABSTRACT

Grits and like proteinaceous material in a form suitable for quick cooking, and possessing a good texture and taste which is comparable to ordinary cooked grits and proteinaceous material is produced by gelatinizing the material with water, steam or mixtures thereof. Gelatinization is achieved by heating the mixture under pressure for a period of time sufficient to completely gelatinize the grits without dextrinization. After gelatinizing the mixture, the pressure is released and expansion of the grit material occurs. The expanded material is then dried to a final moisture content of less than 12% and comminuted to yield a grit sized product which may be readily consumed without cooking in a minimum amount of time. The final product possesses excellent re-hydration qualities.

4 Claims, No Drawings

EXPANSION PROCESS FOR THE PRODUCTION OF INSTANT GRITS

BACKGROUND OF THE INVENTION

A number of methods are known in the art to produce "instant" corn grits and other such starchy and proteinaceous vegetables. While these methods represent substantial progress in developing a truly instant product which can be prepared in the bowl without need of cooking by the consumer, such products suffer from a number of deficiencies such as poor qualities of rehydration, poor taste and palatability or mouth feel. Thus, while the prior art has been successful in reducing the cooking time of corn grit products, this generally has been done at the expense of the texture and flavor characteristics of the product when compared to conventionally cooked products.

Two prior art methods employed in the manufacture of instant grits are illustrated by U.S. Pat. No. 3,664,846 and 3,664,847 which involve the admixture of corn grits, water and polysaccharide gum to a two-stage heating treatment at critical temperatures with subsequent drying of the mixture for a critical period of time in a drum dryer. The resulting product collected from the dried sheet is comminuted to form an instant-type corn grits product. The products produced according to these methods do not require the addition of an emulsifier as employed in other prior art methods as for example illustrated in U.S. Pat. No. 3,526,512 to Collins et al.

In U.S. Pat. No. 3,117,006 to Wenger, a process is described for producing expanded cereal products. The Wenger method involves subjecting starch-containing material to steps of heating, mixing, moisturizing, compressing and pressure release in order to effect maximum expansion of the starch material, and thus increase the bulk size of the end product. The expanded products of the Wenger process are useful as food or as ingredients in food products, such as breakfast cereals, party snacks and the like.

The present invention provides a new process for producing instant corn grits having the advantage of shorter preparation times as well as the elimination of emulsifier ingredients. The process of our invention further provides a product having a texture and mouth feel comparable to conventionally cooked products. Furthermore, the process of the present invention provides a means for increased production of product compared to prior methods of manufacturing instant grits.

Accordingly, it is the object of our invention to provide a corn grit product which may be readily prepared for consumption by simply adding boiling water to the product in a serving bowl.

It is a further object of our invention to provide a corn grit product having excellent rehydration properties.

A still yet further object of our invention is to provide a corn grit product having a texture and mouth feel comparable with that of conventionally cooked corn grits.

Still yet, another object of our invention is to provide a method for providing an instant corn grit and like proteinaceous material product.

SUMMARY OF THE INVENTION

Our method for treating grits and similar proteinaceous material is basically a six-step process which comprises:

a. preparing an initial product of grits by reducing said grits to a fine mesh having a distribution generally of (percentages by weight)

$$\frac{\text{ON 20 mesh}}{10-20\%}, \frac{\text{ON 30 mesh}}{50-75\%}, \frac{\text{ON 40 mesh}}{15-40\%} \text{ and } \frac{\text{thru 40 mesh}}{5\% \text{ maximum}}$$

(all mesh sizes being U.S. Standard sieve)

b. mixing said initial product with water, steam or mixtures thereof;

c. gelatinizing the resulting mixture by heating said mixture under pressure at a temperature and for a period of time sufficient to completely gelatinize the grits therein without any dextrinization;

d. releasing the pressure on the mixture to produce an expanded grit product;

e. drying the expanded grit product to a final moisture content of less than about 12%; and f. comminuting the expanded grit product to a relatively fine mesh size whereby a quick-cooking product is obtained.

All of the product grit preferably passes through a 12 mesh screen and is retained on a 20 mesh screen. This results in a product which when mixed with water possesses a texture and taste comparable to conventional cooked grits and like proteinaceous material, as well as having excellent rehydration qualities.

The initial product employed in the process of our invention may be a blend of various size fine grits or other proteinaceous material. Generally, the grits may be subjected to a grinding treatment to reduce the particle size to a fine mesh. The initial product is a blend of various sizes in certain proportions of the material. The preferred blend includes medium and fine screenings generally having a distribution whereby from 10–20% of the initial product is retained on a 20 mesh screen (U.S. Standard sieve), about 50–75% on a 30 mesh screen, from about 15–40% on a 40 mesh screen and no more than about 5% passing through a 40 mesh screen.

Aside from grits, any additional proteinaceous material may be included within the scope of our invention— for example, wheat, barley, oats and the like are within the generic group of materials suitable for an initial product. The preferred initial product is fine corn grits preferably from white corn, although yellow corn is also well suited for the process. The grit comprises the flinty endosperm of the corn kernel itself. In order to provide the initial product employed in the present invention, it is preferred that the husk and germ be removed from the whole corn kernel. This may be accomplished by roll milling, screening and air sifting according to such conventional methods as illustrated by U.S. Pat. No. 3,399,839 to Anderson et al. which is incorporated herein by reference. Generally, such milling processes will produce several grades of grits such as fine, medium and coarse. The difference in these three grades is the screen sizing used to define each. For the present disclosure, these grades are defined as follows:

fine screenings — 100% passing 30 mesh and retained on 40 mesh screen.

medium screenings — 100% passing 20 mesh and retained on 30 mesh screen.

coarse screenings — 100% passing 12 mesh and retained on 20 mesh screen.

While it is preferred to employ a blend of variable size grits as the initial product in this invention, it has also been found that degerminated whole ground corn kernels as well as whole ground corn with germ may be useful in the present process to produce an instant "grit tasting" corn product. The use of degerminated ground corn kernels and the like yields an instant cornmeal grit tasting product which possesses a taste and texture very similar to conventionally cooked grits. A preferred initial product is freshly prepared regular corn grits readily available from a number of commercial mixes, e.g., Jim Dandy Grits (fine, medium or coarse), produced by The Jim Dandy Company, Birmingham, Ala.

The first step of our process, after selecting and/or preparing a suitable initial product, is to gelatinize the initial product in the presence of water, steam or mixtures thereof. Significant dextrinization of the material does not occur. The term "gelatinization" is defined herein as the complete rupture of the starch granule (grit of whole kernel), brought about by a combination of moisture, heat, pressure and in some instances mechanical shear. The structure of the gelatinized and fully expanded product can have a large cell size or a small size depending upon the initial product processed. Gelatinization is accomplished by heating the initial product under high pressure with water, steam or mixtures thereof under pressure, for a period of time sufficient and at a temperature so as to completely rupture the starch granule.

A preferred apparatus for gelatinizing and subsequently expanding the initial product according to the present invention, is illustrated by Wenger in U.S. Pat. No. 3,117,006, the content of which is incorporated herein by reference. Basically, the expansion method employed in the present invention and described by Wenger involves subjecting the grit material to heat, pressure and high-shear mixing in an expander barrel and, at the same time introducing and blending into the material super-heated water. The material, at an elevated temperature, is churned into a dough-like mass within an expander machine and then discharged from the expander where the sudden decrease of pressure allows the super-heated water to vaporize immediately. This causes the material to swell and expand. The expander of Wenger is basically a high-pressure and temperature extrusion cooker which utilizes water, steam and mixtures thereof to cook and expand starchy materials in a very short period of time.

Treatment of the grit material in such an expander results in both gelatinizing and expanding the material. The expansion is dependent upon the pressure differential between the internal and external surfaces of the die orifice at the end of the expander barrel. The presence of a super-heated volatile substance which will vaporize after extrusion and the plastic nature of the grit material, result in the expansion of the product. In the present process, the conditions of pressure, moisture and temperature which provide for expansion, also provide for full gelatinization and cooking of the material. Thus, gelatinization occurs within the expander barrel and expansion occurs immediately after discharge through the die orifice.

Generally, the residence time within the expander will be a minimum of about 1.5 minutes at a varying temperature throughout the barrel using a water, steam or mixture thereof ratio sufficient so that the moisture content of the expanded material is from about 15–40%. A ratio of about 1:5 (water to grits)—20%—is preferred. Water, steam or mixtures thereof from about 15–40% may be used since only a small part of the water is lost through the expander barrel when the product is extruded through the die, and expansion occurs with some water flashing to steam at the change in pressure. The moisture level within the expansion cooker must be sufficient to allow the fluid mass of grits and water to pass through the die orifice at the discharge end of the expander. However, as the fluid mass passes out of the expander, the moisture content should be enough to allow the grits to retain their fluidity but sufficiently low to permit the expanded grits to stiffen after volatization of the super-heated water.

If desired, the initial product may be preconditioned prior to passing through the expansion barrel. Preconditioning is accomplished by adding steam, water or mixtures thereof to the initial product followed by a thorough mixing before the mixture enters the expander barrel. Steam and/or water may be added to the initial product at temperatures ranging from about 170° F to below boiling (i.e., 212° F) at atmospheric pressure.

The expander barrel is composed of a series of segmented and jacketed heads, screws, and shear points, conveying and compacting the grit/steam and/or water mixture through the length of the barrel at temperatures ranging from 100° to 250° F. The expander barrel is cooled with water jackets and only the mechanical heat of friction in the barrel is sufficient to raise the temperature and gelatinize the product.

The amount of water and/or steam added in preconditioning would be about the same as added in the absence of such a step, i.e., about 15–40%.

It is essential that the grits be thoroughly gelatinized while avoiding dextrinization, i.e., further breakdown of the starch into sugar components. An optimum mixture ratio has been found to be 1 part water to 5 parts grit. However, at higher ratios the process becomes uneconomical due to excess heat required, etc. The conventional steeping processes employed by the prior art have been found unnecessary in the present invention and thus our process of gelatinizing the material without any significant dextrinization eliminates some of the cost and time employed in prior art processes.

During gelatinization, the product will absorb water, and therefore water present must be sufficient to avoid drying and agglomerating at this stage of the process.

After the product has been thoroughly gelatinized, it is subjected to an expansion treatment. Expansion is accomplished in the present process by subjecting the material to high mechanical pressure in the presence of a super-heated liquid, followed by a sudden release of pressure, causing the material to swell. As already noted, the expanded product should have a water content greater than about 15% in order to possess suitable rehydration qualities.

The next step of the process reqires drying of the expanded mass to form a product having a moisture content of less than 12%, preferably to a moisture content of from approximately 9 to 12% on a weight basis, but lower contents may be used. It has been found that drying may be accomplished in air at a temperature of from about 160° to 200° F. This temperature range has been found to be optimum in order to preserve the integrity of the products both with regard to texture and rehydration qualities. However, higher temperatures may be employed. Certainly, lower temperatures may also be employed, but due to the excess cost and increased time consumption such are not feasible as they take a longer period of time to accomplish the required drying. It is therefore necessary that the drying be accomplished in such a manner as to preserve the integrity of the particle, physical shape and texture. Other types of drying may be employed such as microwave, radiant heat, dielectric mechanisms, rotary tumbling dryer, etc., but air drying by such methods as convection dryers has been found to be the most economical. Tests have shown that the time required for drying the product at temperatures between 170° and 180° F to a final moisture content of less than 12% is generally about 50 minutes.

The dry, expanded product is then subjected to a grinding and screening treatment to produce a product of uniform size. Conventional grinding means, such as a fitz mill may be employed to yield a product having the particle size suitable for rehydration. Optionally, the expanded product may be fed directly to a fitz mill, thereby eliminating the need for a drying step. The heat generated in the fitz mill during grinding of the expanded product may be sufficient to reduce the moisture content of the product to the desired level.

The expanded product is comminuted to a particle size suitable for packaging. Preferably, the expanded material is ground to a mesh size finer than 12 U.S. Standard sieve size and being retained upon a 20 mesh screen.

Upon drying, the product mass is found to contain a moisture content of generally between about 9 and 12% and consists of a product which possesses, upon the addition of water, a texture and taste comparable to ordinary cooked grits. The density of the instant grits manufactured according to the process of the present invention is generally about 30 pounds per cubic foot or 492 milligrams per cc.

An optional step, subsequent to drying a grinding of the expanded mass, for improved flavor, involves toasting a portion of the dried product, for example, under the radiant heat of a Chromalox two-element heater. Generally, only about 25% of the mass is toasted. The toasted batch is then mixed back with the remaining 75% of the dried mass to yield a finished product. To toast the grits, any high heat source capable of burning or toasting the product may be employed, such as the Chromalox heater noted. Toasting may be accomplished, for example, by holding such a source approximately 2 inches above the product and sliding a tray containing the product under the heater while shaking the tray until the desired degree of toasting is visibly obtained.

To achieve the desired uniformity in size of the product, the grinding and screening step may be employed either subsequent to toasting and mixing, or subsequent to drying of the product. Such a grinding and screening step is particularly advantageous when initial products other than cracked grits are employed, for example coarse grain or whole grain cornmeal.

It is desirable to add salt to the product. Generally, about 2% salt by weight of the initial product is added, preferably after expansion of the mass and prior to drying. Other additives and conventional preservatives may be added at the same time as the salt to prevent bacteria attack and degradation of the cooked material. Such preservatives are well known in the art and are of an anti-oxidant nature to prevent degradation via air and bacteria. Examples of such additives and preservatives include flavors, cellulose gum, BHA (a preservative), thiamine, riboflavin, niacin and iron.

The following examples are provided to more fully illustrate the invention but are not to be construed as limiting the scope thereof.

EXAMPLE 1

A blend of freshly prepared corn grits (fine grade, commercially available from the Jim Dandy Co.) was preconditioned and fed from a hopper to an expansion cooker (X-25 CF manufactured by the Wenger Manufacturing Co.) along with water in a ratio of 1:5 (water/grits) by weight. The expansion cooker is a five head arrangement, the temperature of the fourth and fifth heads being 180°–220° F and 200°–250° F, respectively. The extruder was operated at a rate of 300 rpm. Residence time in the expander cooker was about 1.5 minutes. Upon extrusion expansion of the initial product, the material was placed in a simple convection drying oven and dried at a temperature of 190° F for about 30 minutes. The dried material was ground in a fitz mill and screened to a particle size finer than 12 mesh. The product had a moisture content of about 9–12%, and upon addition of boiling water readily rehydrated within 1½ to 2 minutes having a taste and texture comparable to ordinary cooked grits.

EXAMPLE 2

Twenty-five percent of the final product of Example 1 is toasted for flavor under a 1100 watt, two element Chromalox radiant heater. This is done by sliding a tray of product under the heater and shaking until desired degree of toasting is visible. The toasted product may be remixed with the remaining final product from Example 1 to give a mixed product of enhanced flavor.

The product of Examples 1 and 2 may, if desired, be mixed with known "instant grit" products. However, this is not necessary to produce a final instant grit product according to our process.

The instant grits prepared according to our process have been both analyzed by gas chromatography and tasted by definitive taste testing and have been found comparable to ordinary cooked grits.

The invention may comprise, consist, or consist essentially of the herein recited steps and materials. The invention in its broarder aspects is not to be limited to the specific details as shown and described, but departures may be made from such details within the scope of the accompanying claims without departing from the principles of the invention.

What is claimed is:

1. A process for treating grits to produce a quick-cooking product, which possesses a texture and taste comparable to ordinary cooked grits as well as good rehydration qualities, consisting essentially of:
   a. preparing an initial product of grits by reducing said grits to a fine mesh;
   b. mixing said initial product with from about 15–40% by weight of water, steam or mixtures thereof;
   c. gelatinizing the resulting mixture by heating said mixture under high mechanical pressure in the presence of super-heated water at a temperature ranging from 100° to 250° F for a period of time sufficient to completely gelatinize the grits therein without significant dextrinization;

d. releasing the pressure on the mixture to produce an expanded grit product having a moisture content of about 15 to 40%;

e. drying the expanded grit produced at a temperature from about 160° to about 200° F to a final moisture content of less than about 12%; and f. comminuting the expanded grit product to a size finer than 12 mesh whereby a quick-cooking product is obtained.

2. Process of claim 1 wherein said drying and comminuting is done in a single step.

3. Process of claim 1 further comprising the step of toasting the dried material.

4. Process of claim 1 further comprising the steps of grinding and screening the dried material to produce a uniform product having a particle size between 12–20 mesh.

* * * * *